(12) United States Patent
Shariff et al.

(10) Patent No.: US 11,577,182 B2
(45) Date of Patent: Feb. 14, 2023

(54) SEPARATION VESSEL AND BUOYANT THERMAL ENERGY TRANSFER DEVICE FOR USE THEREIN

(71) Applicant: Saudi Arabian Oil Company, Dhahran (SA)

(72) Inventors: Maher Maqbool Shariff, Dhahran (SA); Murtala Ahmed Mohammed, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 396 days.

(21) Appl. No.: 16/738,494

(22) Filed: Jan. 9, 2020

(65) Prior Publication Data
US 2021/0213375 A1 Jul. 15, 2021

(51) Int. Cl.
*B01D 17/04* (2006.01)
*B01D 17/02* (2006.01)

(52) U.S. Cl.
CPC ....... *B01D 17/042* (2013.01); *B01D 17/0214* (2013.01); *B01D 2221/04* (2013.01); *B01D 2257/80* (2013.01)

(58) Field of Classification Search
CPC .. B01D 17/04; B01D 17/042; B01D 17/0214; B01D 2221/04; B01D 2257/80
See application file for complete search history.

(56) References Cited

U.S. PATENT DOCUMENTS

| | | | | |
|---|---|---|---|---|
| 1,716,934 A | * | 6/1929 | Smith | B01D 17/042 210/187 |
| 2,421,375 A | * | 6/1947 | Elliott | E21B 43/34 210/187 |
| 2,774,856 A | * | 12/1956 | Paulsen | H05B 3/80 126/25 R |
| 4,599,973 A | * | 7/1986 | Ward | A01K 7/027 219/523 |

(Continued)

FOREIGN PATENT DOCUMENTS

| | | |
|---|---|---|
| CN | 101112704 A | 1/2008 |
| CN | 201241682 Y | 5/2009 |

(Continued)

OTHER PUBLICATIONS

International Search Report and Written Opinion dated Feb. 2, 2021 pertaining to International application No. PCT/US2020/056817 filed Oct. 22, 2020, 15 pgs.

*Primary Examiner* — Youngsul Jeong
(74) *Attorney, Agent, or Firm* — Dinsmore & Shohl LLP (57) ABSTRACT

A separation vessel containing a multi-phase mixture comprising oil and water comprises a buoyant thermal energy transfer device. The buoyant thermal energy transfer device further comprises a thermally conductive body and an internal heating element. The buoyant thermal energy transfer device defines a collective specific gravity between about 0.7 and about 1.2, which may be accomplished by adding positioning floats to the buoyant thermal energy transfer device. With such a collective specific gravity, the buoyant (Continued)

thermal energy transfer device is situated in the emulsion layer of the multi-phase mixture, with the internal heating element applying heat to emulsion layer, aiding in the breakage of emulsions. Demulsified oil and water may then be removed from the separation vessel.

18 Claims, 5 Drawing Sheets

(56) References Cited

U.S. PATENT DOCUMENTS

| | | | |
|---|---|---|---|
| 5,240,617 A * | 8/1993 | Hopf | B01D 17/048 |
| | | | 210/708 |
| 5,865,992 A | 2/1999 | Edmondson | |
| 8,354,812 B2 | 1/2013 | Lee et al. | |
| 2019/0282929 A1 | 9/2019 | Shelton et al. | |

FOREIGN PATENT DOCUMENTS

| | | |
|---|---|---|
| CN | 102590028 A | 7/2012 |
| CN | 103043829 A | 4/2013 |
| CN | 104655443 A | 5/2015 |
| CN | 204689667 U | 10/2015 |
| CN | 106938151 A | 7/2017 |
| CN | 107216912 A | 9/2017 |
| CN | 108675473 A | 10/2018 |
| JP | 2003154202 A | 5/2003 |

* cited by examiner

SEPARATION VESSEL AND BUOYANT THERMAL ENERGY TRANSFER DEVICE FOR USE THEREIN

BACKGROUND

The present disclosure relates generally to petroleum processing and, more specifically, to separation vessels used therein.

BRIEF SUMMARY

The present inventors have recognized that oil-water emulsions can present challenges in petroleum processing. These emulsions require specific attention from producers during the recovery, treatment, and transportation of crude oils. Increasing needs for addressing the processing of oil-water emulsions are prevalent, as available processes are typically time-consuming and costly.

While these emulsions can be broken by gravity, it is problematic to rely solely on gravity because it often requires extending processing times and can be impractical in petroleum processing. Demulsifiers can be used to treat oil-water emulsions but they are often needed in large quantities, especially in a large-scale production, which adds to processing costs. The present inventors have recognized that heat can be used to aid the breakage of oil-water emulsions, but care must be taken to ensure process efficiency and reduce wasted energy when using heat.

In accordance with one embodiment of the present disclosure, a separation vessel containing a multi-phase mixture comprising oil and water comprises a vessel body, a water outlet, an oil outlet, and a buoyant thermal energy transfer device. The multi-phase mixture comprises an emulsion layer comprising emulsified oil and water, separated oil above the emulsion layer, and separated water below the emulsion layer. The water outlet is in fluidic communication with the separated water below the emulsion layer. The oil outlet is in fluidic communication with the separated oil above the emulsion layer. The buoyant thermal energy transfer device comprises a thermally conductive body and an internal heating element. The thermally conductive body comprises an upper face, a lower face, and a thermally conductive heat transfer medium comprising a thickness dimension separating the upper and lower faces. The upper face of the thermally conductive body comprises an upper active surface area and the lower face of the thermally conductive body comprises a lower active surface area. The thermally conductive body resides within the emulsion layer and the upper and lower active surface areas of the thermally conductive body are in contact with material of the emulsion layer. The internal heating element defines a heat source zone spaced from the active surface areas of the upper and lower faces of the thermally conductive heat transfer medium, within the thermal energy transfer device thickness dimension. The thermally conductive heat transfer medium forms a heat transfer path extending from the heat source zone to the upper and lower active surface areas of the thermally conductive body. The buoyant thermal energy transfer device defines a collective specific gravity of between about 0.7 and about 1.2.

In accordance with another embodiment of the present disclosure, a buoyant thermal energy transfer device comprises a thermally conductive body and an internal heating element.

In accordance with another embodiment of the present disclosure, a separation vessel containing a multi-phase mixture comprising oil and water comprises a buoyant thermal energy transfer device.

Although the concepts of the present disclosure are described herein with primary reference to particular types of separation vessels and separation vessel configurations, it is contemplated that the concepts will enjoy applicability to any of a variety of separation vessels. For example, and not by way of limitation, it is contemplated that the concepts of the present disclosure will enjoy applicability to separation vessels with or without weirs.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
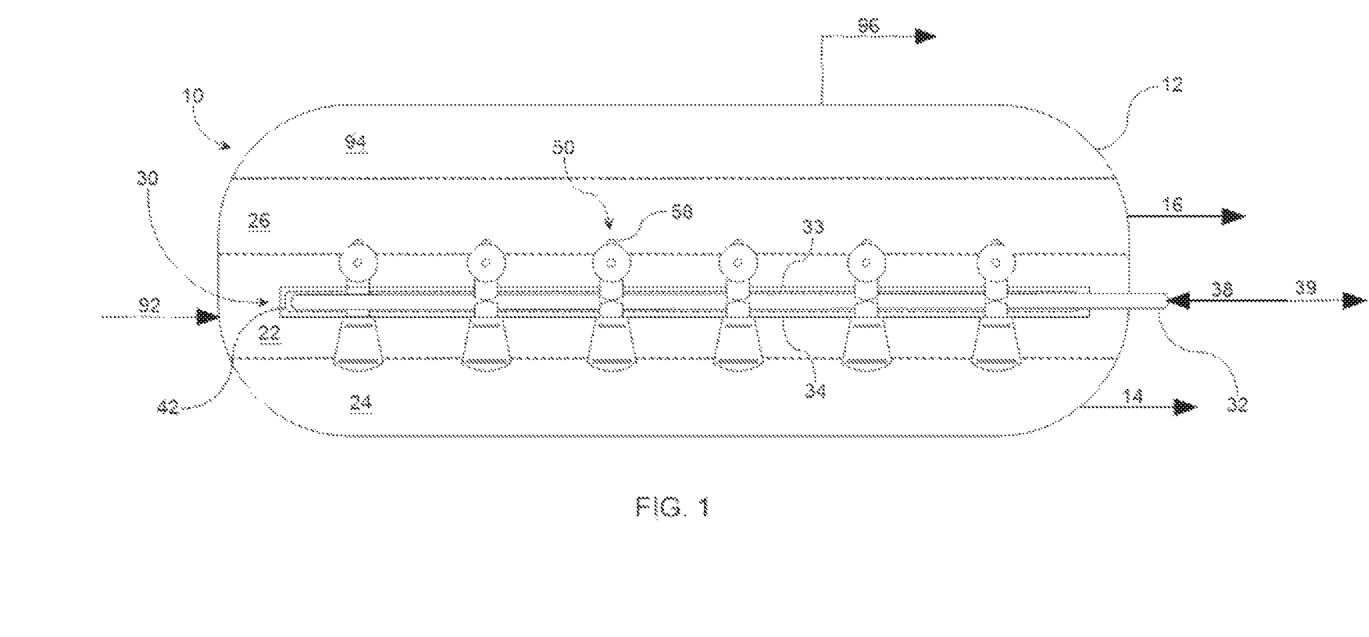
FIG. 1 is a schematic illustration of a separation vessel according to one embodiment of the present disclosure.

Referring initially to FIG. 1, a separation vessel 10 containing a multi-phase mixture comprising oil and water is schematically depicted. The separation vessel 10 comprises a vessel body 12, a water outlet 14, an oil outlet 16, and a buoyant thermal energy transfer device 30. The multi-phase mixture comprises an emulsion layer 22 comprising emulsified oil and water, separated water 24 below the emulsion layer 22, and separated oil 26 above the emulsion layer 22. The water outlet 14 is in fluidic communication with the separated water 24 below the emulsion layer 22 and the oil outlet 16 is in fluidic communication with the separated oil 26 above the emulsion layer 22. In some embodiments, the separation vessel 10 may further comprise a multi-phase mixture inlet 92 in fluidic communication with the contained volume of the vessel body 12. In other embodiments, the multi-phase mixture may further comprise a layer of gas 94. In embodiments where the multi-phase mixture comprises gas 94, a gas outlet 96 can be placed in fluidic communication with the gas 94 above the separated oil 26.

Figure 2:
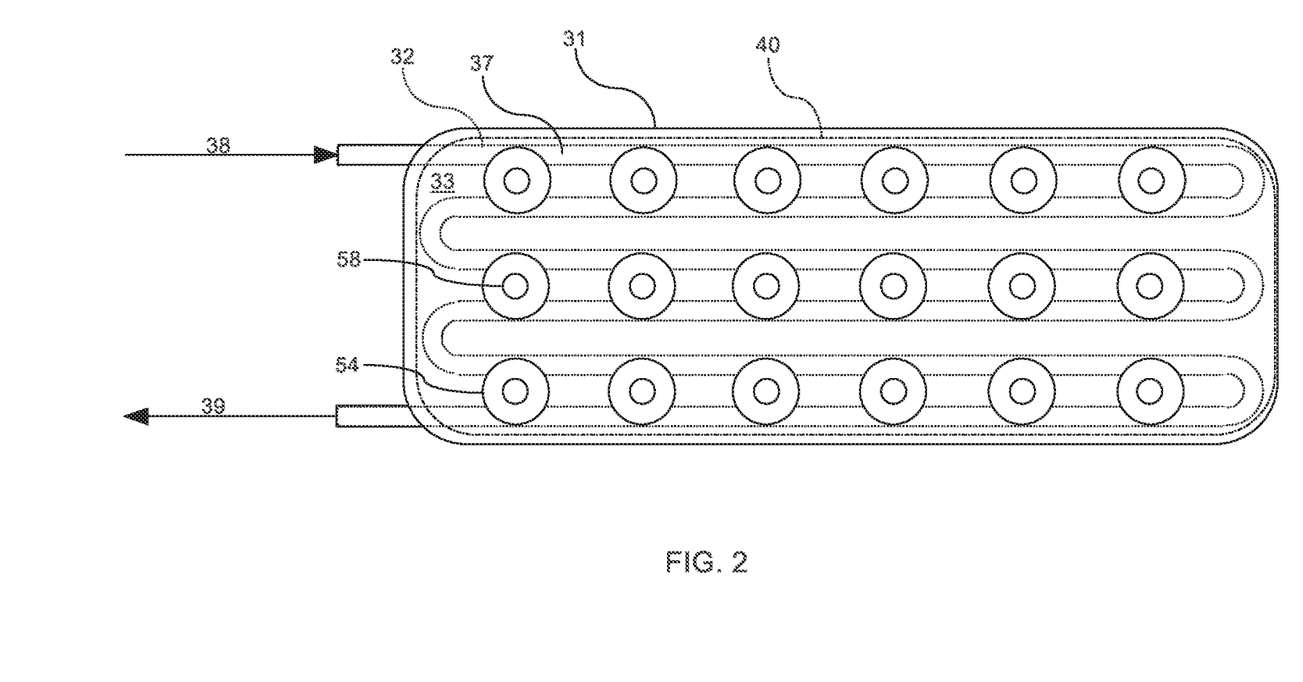
FIG. 2 is a schematic illustration of a buoyant thermal energy transfer device according to one embodiment of the present disclosure.
Figure 3:
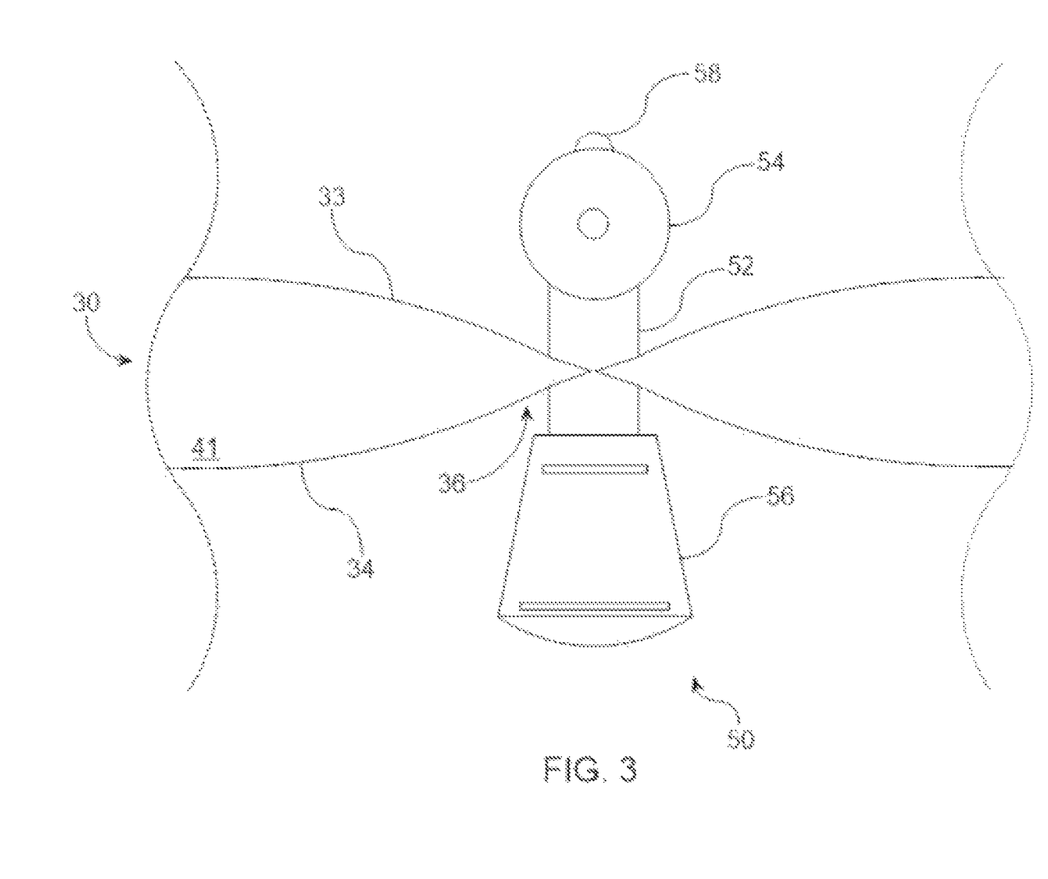
FIG. 3 is a schematic illustration of a positioning float compressing a thermally conductive heat transfer medium of a buoyant thermal energy transfer device according to one embodiment of the present disclosure.

Referring additionally to FIGS. 2 and 3, the buoyant thermal energy transfer device 30 comprises a thermally conductive body 31 and an internal heating element 32. As seen in FIG. 3, the thermally conductive body comprises an upper face 33, a lower face 34, and a thermally conductive heat transfer medium 41 comprising a thickness dimension separating the upper face 33 and lower face 34. The upper face 33 of the thermally conductive body 31 comprises an upper active surface area 40 included within the upper face 33. Similarly, the lower face 34 of the thermally conductive body comprises a lower active surface area included within the lower face 34. The lower active surface area is not depicted in FIG. 2 because it is on the opposite side of the thermally conductive body 31. The thermally conductive body 31 is located within the emulsion layer 22 and the upper active surface area 40 and lower active surface area of the thermally conductive body 31 are in contact with the material of the emulsion layer 22. However, it should be understood that in other embodiments, only a portion of the thermally conductive body 31 may reside within the emulsion layer 22, and only portions of upper active surface area 40 and lower active surface area are in contact with material of the emulsion layer 22.

As seen in FIG. 1, the internal heating element 32 defines a heat source zone 42 spaced from the active surface areas of the upper face 33 and lower face 34 of the thermally conductive heat transfer medium 41, within the thermal energy transfer device thickness dimension. As used herein, the heat source zone 42 is the area of the thermally conductive body 31 where the majority of the heat is introduced into the buoyant thermal energy transfer device 30. The thermally conductive heat transfer medium 41 forms a heat transfer path extending from the heat source zone 42 to the upper active surface area 40 and lower active surface area of the thermally conductive body 31. In total, the buoyant thermal energy transfer device 30 may define a specific gravity of between about 0.7 and about 1.2, more particularly, a specific gravity of between about 0.76 (Crude oil 48° API @ 54.4° C.) and 0.876 (Crude oil, Texas @ 15.6° C.) and for the heavy produced water the specific gravity range is between 1.0 and 1.13, more particularly, the actual value of the specific gravity is between about 0.88 and about 0.95. Specific gravity is defined and used herein to represent the ratio of the total density of the buoyant thermal energy transfer device to the density of water.

Figure 4:
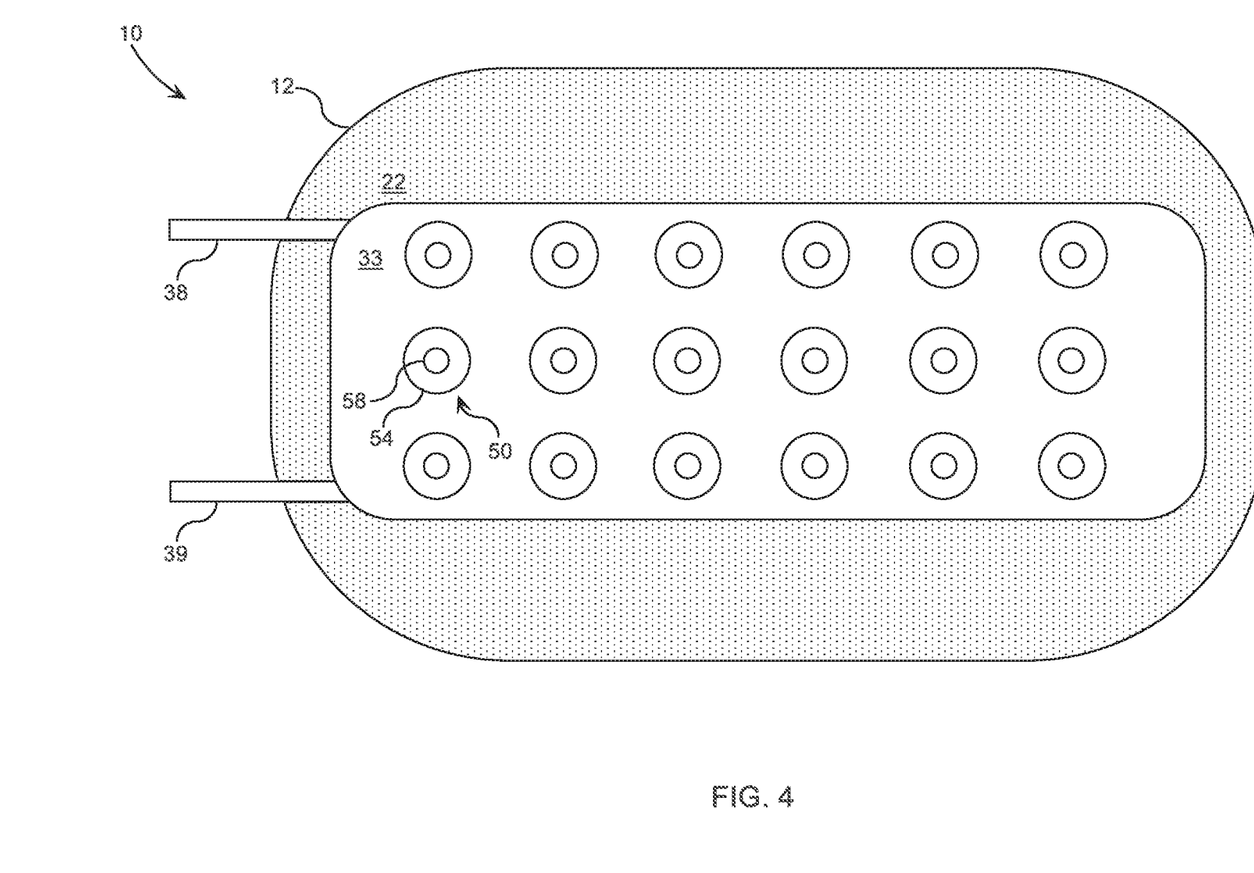
FIG. 4 is an alternative view of a separation vessel according to one embodiment of the present disclose.

Now referring to FIG. 4, the emulsion layer 22 of the multi-phase mixture comprises a contained cross-sectional area bounded by the walls of the vessel body 12. The upper active surface area 40 and lower active surface area of the thermally conductive body 31 are at least about 10% as large as the contained cross-sectional area of the emulsion layer 22. In some embodiments, it is contemplated that the upper active surface area 40 and lower active surface area of the thermally conductive body 31 will be at least about 50% of the contained cross-sectional area of the emulsion layer 22. In some embodiments, the separation vessel 10 comprises a plurality of buoyant thermal energy transfer devices, and the upper active surface areas and lower active surface areas of the plurality of buoyant thermal energy transfer devices collectively occupy at least about 50% of the contained cross-sectional area of the emulsion layer 22.

The thermally conductive heat transfer medium 41 may comprise a compressible foam substrate embedded with a thermally conductive filler. In some embodiments, the foam substrate comprises polyvinyl chloride, polyurethane, polyethylene, silicone rubber, or combinations thereof, and the thermally conductive filler comprises carbon, carbon nanotubes, graphene, graphite, boron nitride, or combinations thereof. The thermally conductive heat transfer medium may, for example, have a thermal conductivity greater than 200 W/m*K ($\lambda$). As used herein, thermal conductivity is defined to represent the ability of a material to conduct heat, is measured in watts per square meter of surface area for a temperature gradient of one Kelvin per one meter of thickness, expressed as W/m*K, or alternatively as $\lambda$. In some embodiments, the heat transfer medium thickness dimension may be less than about 100 cm. In other embodiments, the heat transfer medium thickness dimension may be less than about 50 cm. To generalize this matter for engineering practice, the aspect ratio of all parameters of the geometry consisting of the vessel and the BED may be fixed mathematically. In some embodiments, the vessel may have Length, L, Diameter, D, and BED thickness, $t_{BED}$. In such embodiments, the vessel may be designed such that: D=0.1 L, and $t_{BED}$=0.1 D. For example, the values obtained from a BED thickness of 50 cm, based on the formula shown above, result in a vessel 50 meters in length and 5 meters in diameter. The BED may be applied to horizontal, vertical and spherical vessel geometric configuration. A minimal heat transfer medium thickness dimension permits the buoyant thermal energy transfer device 30 to remain fully positioned within the emulsion layer 22, with both the upper active surface area 40 and lower active surface area targeting heat to the emulsion layer 22.

Figure 5:
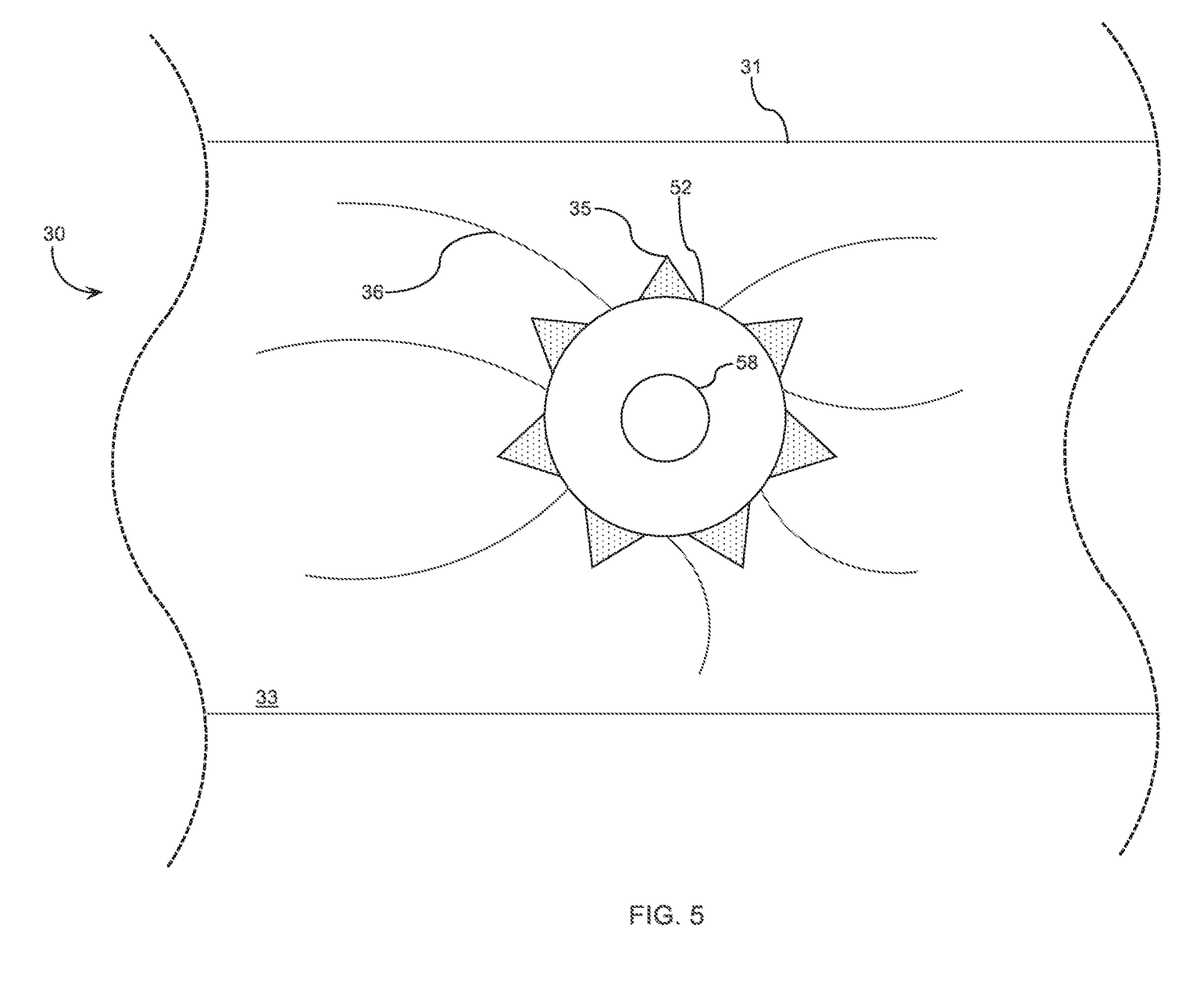
FIG. 5 is an alternative view of a positioning float compressing a thermally conductive heat transfer medium of a buoyant thermal energy transfer device according to one embodiment of the present disclosure.

Referring to FIG. 5, it is contemplated that, in some embodiments, the thermally conductive body 31 may comprise a plurality of separator passages 35 extending across the thermally conductive body 31 between the upper face 33 and the lower face 34 of the thermally conductive body 31. The plurality of separator passages 35 extending across the thermally conductive body 31 may be arranged in a uniform or non-uniform manner. The buoyant thermal energy transfer device 30 may further comprise a plurality of compression clamps 52 positioned in alignment with respective ones of the separator passages 35 to form depressions 36 in the compressible foam substrate in alignment with the separator passages 35. The depressions 36 formed by the compression clamps 52 may form on both the upper face 33 and lower face 34 of the thermally conductive body 31. The separator passages 35 and depressions 36 can be provided to promote the passage of any separated water 24 above the buoyant thermal energy transfer device 30 across the thermally conductive body 31 to the separated water 24 below the emulsion layer 22. Conversely, the separator passages 35 and depressions 36 can be provided to promote the passage of any separated oil 26 below the buoyant thermal energy transfer device 30 across the thermally conductive body 31 to the separated oil 26 above the emulsion layer 22.

Returning to FIG. 3, it is contemplated that, in some embodiments, the buoyant thermal energy transfer device 30 may further comprise positioning floats 50 in alignment with respective ones of the separator passages 35. These positioning floats may, or may not, be mechanically coupled to corresponding compression clamps 52, but are mechanically coupled to the thermally conductive body 31 at contact points that are distributed across the upper face 33 of the thermally conductive body 31. In this manner, the positioning floats can be used to uniformly decrease the collective specific gravity of the buoyant thermal energy transfer device 30. The positioning floats 50 may comprise respective upper float body portions 54 and lower float body portions 56, with the upper float body portions 54 and lower float body portions 56 being positioned on opposite sides of the thermally conductive body 31. The upper float body portions 54 may have a lower specific gravity than the lower float body portions 56. In this manner, the buoyant thermal energy transfer device 30 will be more inclined to float with the upper face 33, and the upper active surface area 40, facing up, and will be less inclined to flip in the separation vessel.

The buoyant thermal energy transfer device 30 may further comprise level sensors 58 affixed to the positioning floats 50. The level sensors 58 can be used to provide information indicative of the vertical position of select portions of the buoyant thermal energy transfer device 30 within the separation vessel 10 and, more particularly, to ensure that the buoyant thermal energy transfer device 30 is centrally positioned within the emulsion layer 22 of the multi-phase mixture. The level sensors 58 may, for example, be ultrasonic sensors, laser sensors, radar sensors, RFID tags, GPS tags, or any type of passive or active sensor or tag configuration that can be used to collect information regarding the single or multi-dimensional position or orientation of the level sensors 58 in the separation vessel 10. Although, in the illustrated embodiment the level sensors 58 are affixed to the positioning floats 50, it is contemplated that the level sensors 58 may be affixed to any portion of the buoyant thermal energy transfer device 30.

Returning to FIG. 2, in one embodiment, the internal heating element 32 comprises fluidic tubing 37 that is structurally arranged to circulate a heated fluid through the buoyant thermal energy transfer device 30. The fluidic tubing 37 comprises a fluidic inlet 38 and a fluidic outlet 39, both of which may be placed in communication with a recirculating heat exchanger or some other means of circulating reheated fluid through the fluidic tubing 37 of the internal heating element 32. When the internal heating element 32 comprises fluidic tubing 37 that circulates a heated fluid through the buoyant thermal energy transfer device 30, the heat source zone 42 is the area of the thermally conductive body 31 where substantially all, or at least most, of the heat from the working fluid in the fluidic tubing 37 is dispersed. In other embodiments, the internal heating element 32 comprises an electrical heating element that converts electricity into heat. The electrical heating element may be any type of conventional or yet to be developed heating element including, for example, wire-type heating elements or thin film heating elements. When the internal heating element 32 comprises an electrical heating element that converts electricity into heat, the heat source zone 42 is the area of the thermally conductive body 31 where substantially all, or at least most, of the wire-type heating elements, thin film heating elements, or any yet to be developed heating elements reside.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A separation vessel containing a multi-phase mixture comprising oil and water, the separation vessel comprising:
    a vessel body,
    a water outlet,
    an oil outlet, and
    a buoyant thermal energy transfer device, wherein:
    the multi-phase mixture comprises an emulsion layer comprising emulsified oil and water, separated oil above the emulsion layer, and separated water below the emulsion layer;
    the water outlet is in fluidic communication with the separated water below the emulsion layer;
    the oil outlet is in fluidic communication with the separated oil above the emulsion layer;
    the buoyant thermal energy transfer device comprises a thermally conductive body and an internal heating element;
    the thermally conductive body comprises an upper face, a lower face, and a thermally conductive heat transfer medium comprising a thickness dimension separating the upper and lower faces;
    the upper face of the thermally conductive body comprises an upper active surface area and the lower face of the thermally conductive body comprises a lower active surface area;
    the thermally conductive body resides within the emulsion layer and the upper and lower active surface areas of the thermally conductive body are in contact with material of the emulsion layer;
    the internal heating element defines a heat source zone spaced from the active surface areas of the upper and lower faces of the thermally conductive heat transfer medium, within the buoyant thermal energy transfer device thickness dimension;
    the thermally conductive heat transfer medium forms a heat transfer path extending from the heat source zone to the upper and lower active surface areas of the thermally conductive body; and
    the buoyant thermal energy transfer device defines a specific gravity of between about 0.7 and about 1.2.

2. The separation vessel as claimed in claim 1 wherein the buoyant thermal energy transfer device defines a specific gravity of between about 0.88 and about 0.95.

3. The separation vessel as claimed in claim 1 wherein:
    the emulsion layer comprises a contained cross-sectional area of the emulsion layer in the vessel body; and
    the upper and lower active surface areas of the thermally conductive body are at least about 10% as large as the contained cross-sectional area of the emulsion layer.

4. The separation vessel as claimed in claim 1 wherein:
    the emulsion layer comprises a contained cross-sectional area of the emulsion layer in the vessel body; and
    the upper and lower active surface areas of the thermally conductive body are at least about 50% of the contained cross-sectional area of the emulsion layer.

5. The separation vessel as claimed in claim 1 wherein:
    the separation vessel comprises a plurality of buoyant thermal energy transfer devices; and
    the upper and lower active surface areas of the plurality of buoyant thermal energy transfer devices collectively occupy at least about 50% of a contained cross-sectional area of the emulsion layer.

6. The separation vessel as claimed in claim 1 wherein the thermally conductive heat transfer medium comprises a foam substrate embedded with a thermally conductive filler.

7. The separation vessel as claimed in claim 6 wherein:
the foam substrate comprises polyvinyl chloride, polyurethane, polyethylene, silicone rubber, or combinations thereof; and
the thermally conductive filler comprises carbon, carbon nanotubes, graphene, graphite, boron nitride, or combinations thereof.

8. The separation vessel as claimed in claim 1 the thermally conductive heat transfer medium thickness dimension is less than about 50 cm.

9. The separation vessel as claimed in claim 1 wherein:
the thermally conductive heat transfer medium comprises a compressible foam substrate; and
the thermally conductive body comprises a plurality of separator passages extending across the thermally conductive body between the upper face and the lower face of the thermally conductive body.

10. The separation vessel as claimed in claim 9 wherein the buoyant thermal energy transfer device further comprises a plurality of compression clamps positioned in alignment with respective ones of the separator passages to form depressions in the compressible foam substrate in alignment with the separator passages.

11. The separation vessel as claimed in claim 10 wherein the buoyant thermal energy transfer device further comprises positioning floats coupled to the compression clamps in alignment with respective ones of the separator passages.

12. The separation vessel as claimed in claim 1 wherein the buoyant thermal energy transfer device further comprises positioning floats mechanically coupled to the thermally conductive body at contact points that are distributed across the upper face of the thermally conductive body to uniformly decrease the specific gravity of the buoyant thermal energy transfer device.

13. The separation vessel as claimed in claim 12 wherein:
the positioning floats comprise respective upper float body portions and a lower float body portions;
the upper and lower float body portions are positioned on opposite sides of the thermally conductive body.

14. The separation vessel as claimed in claim 13 wherein the upper float body portions have a lower specific gravity than the lower float body portions.

15. The separation vessel as claimed in claim 12 wherein the buoyant thermal energy transfer device further comprises level sensors affixed to the positioning floats.

16. The separation vessel as claimed in claim 12 wherein:
the thermally conductive heat transfer medium comprises a compressible foam substrate;
the thermally conductive body comprises a plurality of separator passages extending across the thermally conductive body between the upper face and the lower face of the thermally conductive body; and
the positioning floats comprise compression clamps positioned in alignment with respective ones of the separator passages to form depressions in the compressible foam substrate in alignment with the separator passages.

17. The separation vessel as claimed in claim 1 wherein the buoyant thermal energy transfer device further comprises level sensors that are positioned to provide information indicative of vertical positions of select portions of the buoyant thermal energy transfer device within the separation vessel.

18. The separation vessel as claimed in claim 1 wherein:
the thermally conductive heat transfer medium comprises a compressible foam substrate, a plurality of compression clamps, a plurality of positioning floats, and a plurality of level sensors;
the compressible foam substrate is embedded with a thermally conductive filler;
the plurality of compression clamps are positioned in alignment with respective ones of a plurality of separator passages extending across the thermally conductive body to form depressions in the compressible foam substrate in alignment with the separator passages;
the positioning floats are mechanically coupled to the thermally conductive body at contact points that are distributed across the upper face of the thermally conductive body by the compression clamps;
the level sensors are affixed to the positioning floats;
the thermally conductive heat transfer medium thickness dimension is less than about 100 cm; and
the buoyant thermal energy transfer device defines a specific gravity of between about 0.88 and about 0.95.

* * * * *